Oct. 31, 1961  R. O. WATSON  3,006,065
METHOD OF REPAIRING WORN SURFACES IN SHAFTS
Filed Jan. 30, 1959

INVENTOR.
RALPH O. WATSON
BY
Patrick O'Beaven
Atty.

3,006,065
METHOD OF REPAIRING WORN SURFACES IN SHAFTS
Ralph O. Watson, 772 Hastings Ave., Salinas, Calif.
Filed Jan. 30, 1959, Ser. No. 790,110
1 Claim. (Cl. 29—401)

This invention relates to a method for repairing worn shafts and other surfaces, the principal object being to replace the worn away surfaces, so that a shaft can remain in use for a much greater period of time without complete replacement.

Another object of the invention is to provide a method for repairing surfaces, such as the worn surfaces of shafts, wherein a wire filler is employed, having a solder coating, to the end that when the recess of the surface is to be filled, as with this special wire, the wire need only be heated to melt the solder coating thereof to fill spaces between the wiring and between the wiring and the recess sides and bottom, thus integralizing the filler and worn structure, so that in the instance of shafts, the shaft can be turned on a lathe, to cut off any surplus wiring and solder that may project beyond the periphery.

A further object of the invention is to provide a method whereby worn shafts and the like can be easily repaired, through the medium of a special filler wire and a mere treatment of the placed wire by heat and a subsequent lathe cutting action against the cooled co-hered filler mass.

The subject matter here is an improvement on my copending application Serial No. 756,718.

Other objects and advantages of the invention will become apparent to the reader of the following description.

Figure 1:
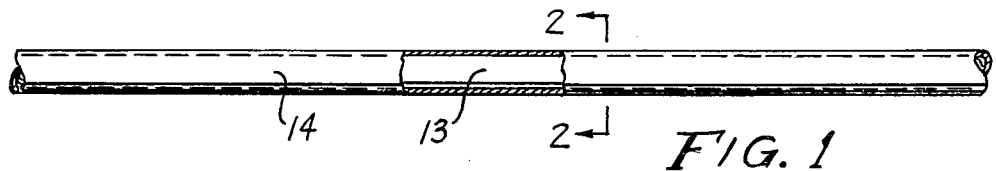
FIGURE 1 is a fragmentary side elevational view of the filler wire, shown with a coating of solder thereon.
Figure 2:
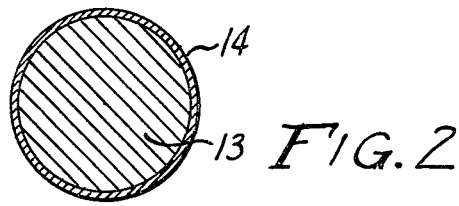
FIGURE 2 is an enlarged cross-section taken on line 2—2 of FIGURE 1.

Referring to the drawing wherein like numerals designate like parts, it can be seen that numeral 10 denotes a shaft which having a worn portion has been lathe chamfered to provide a circumferential recession 11, the end portions of the bottom of this chamfer being curved to merge with the circumferential side walls of the shaft 10 at said chamfer as at 12.

To be wound into this chamfered portion of the shaft 10 is a wire 13 such as is used as a welding rod, in welding apparatus and this wire 13 has a coating 14 of bronze or silver solder.

Figure 3:
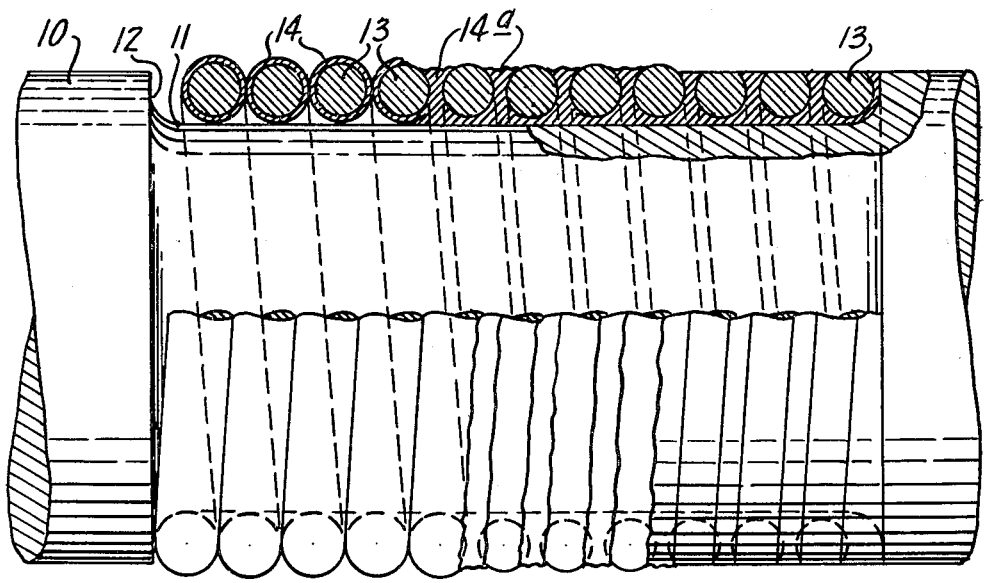
FIGURE 3 is an enlarged sectional view fragmentarily showing a shaft and the filler wire disposed in the chamfered portion of the shaft.

The wire 13 is wound into the chamfer 11 as shown in FIGURE 3.

FIGURE 3 is a composite view showing to the left convolutions that have not as yet been heated, to melt off the solder coating of the wire. The medial portion of this winding shows the solder coating melted off as at 14a, solder having run down and under the convolutions, whereas the right three convolutions of the coiled wire shows the outer portions of the cooled solder and tangent portions of the convolutions lathe cut to make this portion of the filler structure flush with the periphery of the shaft 10.

Of course, additional solder can be used to fill any vacancies, preparatory to the operation of lathe cutting the filler to the desired perimeter, flush with the outside of the shaft 10.

It will be understood, that the convolutions are sufficiently spaced so as to permit the melted solder to run between the convolutions and into all spaces within and around the wire 13, as suggested at the medial point of FIGURE 3. Of course, the heating application is effected solely as the shaft is rotated into the face of the heat, which of course should be at the top of the shaft so that the solder will have an opportunity to solidify and not gravitate away from the wire and shaft.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A method of repairing a worn portion of a shaft consisting in first circumferentially chamfering the shaft at the worn portion thereof, winding a solder coated wire within the chamfered portion, so that a portion of its periphery projects outwardly beyond the chamfer, applying heat to the wire and solder, to cause melting of the solder around and internally of the so-formed coil, to cause setting of the wire within the chamfer as a filler and then smoothing off the projecting periphery of the filler to flushness with the other surface of the shaft.

References Cited in the file of this patent

UNITED STATES PATENTS

| | | |
|---|---|---|
| 1,357,739 | Steenstrup | Nov. 2, 1920 |
| 1,366,922 | Murphy | Feb. 1, 1921 |
| 1,374,624 | Zumwalt | Apr. 12, 1921 |
| 1,884,104 | Moore | Oct. 25, 1932 |
| 1,947,493 | Rose | Feb. 20, 1934 |
| 2,182,238 | Rasmussen | Dec. 5, 1939 |
| 2,210,353 | Barnes | Aug. 6, 1940 |
| 2,373,038 | Lindsay | Apr. 3, 1945 |
| 2,410,850 | Wasserman | Nov. 12, 1946 |
| 2,463,580 | Warskyk | Mar. 8, 1949 |

FOREIGN PATENTS

| | | |
|---|---|---|
| 838,972 | France | Dec. 16, 1938 |
| 109,334 | Australia | Dec. 21, 1939 |